United States Patent
Chen et al.

[19]

[11] Patent Number: 5,874,792
[45] Date of Patent: Feb. 23, 1999

[54] BICYCLE GENERATOR

[75] Inventors: Shih-Chou Chen; Tung-Chuan Wu, both of Hsinchu; Chen-Sheng Weng, Hsinchu Hsien; Ray-Ten Chen, Tsupei, all of Taiwan

[73] Assignee: Industrial Technology Research Institute, Hsinchu, Taiwan

[21] Appl. No.: 872,174

[22] Filed: Jun. 10, 1997

[51] Int. Cl.⁶ ..................................................... H02K 7/10
[52] U.S. Cl. ................... 310/75 C; 310/67 A; 310/67 R; 310/268
[58] Field of Search ................................ 310/75 C, 67 R, 310/268, 67 A

[56] References Cited

U.S. PATENT DOCUMENTS

| | | | |
|---|---|---|---|
| 3,884,317 | 5/1975 | Kinzel | 180/34 |
| 4,559,462 | 12/1985 | Hernandez-Badillo | 310/67 A |
| 4,860,176 | 8/1989 | Bauwens et al. | 362/72 |
| 5,268,602 | 12/1993 | Schwaller | 310/67 A |

*Primary Examiner*—Nestor Ramirez
*Assistant Examiner*—Thanh Lam
*Attorney, Agent, or Firm*—Bacon & Thomas, PLLC

[57] ABSTRACT

A bicycle generator including a coil stator and a magnetic rotor. The coil stator includes a planar support, and an induction coil portion formed by a plurality of series-connected coil units which are evenly spaced along the circumference of the planar support. The magnetic rotor is rotatable relative to and substantially parallel to the coil stator, and includes a permanent magnet having a plurality of magnetic pole pairs formed on its circumference. The number of coil units in the induction coil portion is equal to the number of magnetic pole pairs in the magnetic rotor, and the coil units is winded into trapezoid or sector shape, and the span angle of each of the magnetic pole in the magnetic rotor is substantially equal to the span angle of each of the coil units in the coil stator. Alternatively, the bicycle generator may comprises a cylindrical coil stator and a cylindrical magnetic rotor. The coil stator includes a cylindrical support having a first cylindrical surface, and a cylindrical induction coil portion formed by a plurality of series-connected coil units which are evenly spaced on the first cylindrical surface of the cylindrical support in the circumferential direction. The cylindrical magnetic rotor includes a second cylindrical surface and a permanent magnet having a plurality of magnetic pole pairs formed on the second cylindrical surface facing the cylindrical induction coil portion.

4 Claims, 9 Drawing Sheets

BICYCLE GENERATOR

BACKGROUND OF THE INVENTION

1. Field of the Invention

This invention relates to a generator, and more particularly, to a generator included in a bicycle having relatively rotatable members.

2. Background of the Invention

As is well known, a generator (dynamo) installed in a bicycle includes a stator fixed to the frame of the bicycle, and a rotor which can be driven by frictional force produced by a bicycle wheel so as to rotate relative to the stator. Through the relative rotation between the rotor which is usually a magnet and the stator including multiple teeth and slots formed between adjacent teeth for receiving stator coils, electricity generation is carried out to generate a voltage of alternating sine wave. Since the air gap between the tooth and the rotor and the air gap between the slot and the rotor are greatly different from each other, the magnetic property of the stator changes from place to place, which is the so-called "slot effect". When the rotor is assembled into the stator, the "slot effect" results in great reluctance torque which will greatly increase the rider's load and deteriorate the efficiency of the generator. Consequently, this sort of conventional bicycle installed with a prior generator has lost popularity in market today.

SUMMARY OF THE INVENTION

In view of the aforesaid drawbacks of the conventional bicycle, the object of this invention is to provide a bicycle generator which, when installed on a bicycle, will not increase the rider's load. Besides, the efficiency of the generator can be improved in comparison with a prior bicycle generator.

In general, a generator converts mechanical energy into electrical energy basing on the electromagnetic induction principle—namely, an electromotive force will be induced in a conductor which moves relative to a magnetic field. Basically, a generator comprises the following primary elements:

(1) magnetic pole(s) establishing a magnetic field;

(2) coil(s) cutting the magnetic field so as to produce an induced electromotive force (emf); and (3) mechanical energy source enabling the relative motion between the magnetic field and the coil(s).

In specific, magnitude of the induced emf generated by a generator is proportional to the magnetic field density, the number of turns of the coil(s), and the speed of relative motion of the coil(s) or the conductor. This induced emf can be expressed as follows:

$$E = B \times L \times V \times N \ (Volt)$$

wherein,

E: induced emf (Volt)

B: magnetic flux density (Web/square meter)

L: length of the conductor (meter)

V: speed of the conductor (meter/sec)

N: number of turns of the coil(s) (turn)

Basing on the above principle, this invention provides a generator in which the front wheel of a bicycle is used as the required mechanical energy source, a magnetic rotor is attached to the front wheel for establishing the magnetic field, and a coil stator is fixed to the frame of the bicycle as the coil(s) for cutting the magnetic field so as to produce an induced electromotive force (emf).

A bicycle generator according to the first aspect of the invention comprises a planar coil stator and a planar magnetic rotor. The coil stator includes a planar support, and an induction coil portion formed by a plurality of series-connected coil units which are evenly spaced along the circumference of the planar support. The magnetic rotor is rotatable relative to and substantially parallel to the coil stator, and includes a permanent magnet having a plurality of magnetic pole pairs formed on the circumference thereof.

A generator according to the second aspect of the invention comprises a cylindrical coil stator and a cylindrical magnetic rotor. The cylindrical coil stator includes a cylindrical support, and an induction coil portion formed by a plurality of series-connected coil units which are evenly spaced on the cylindrical surface of the cylindrical support in the circumferential direction. The cylindrical magnetic rotor, substantially coaxial with and radially spaced from said cylindrical coil stator, is rotatable relative to the cylindrical coil stator. The cylindrical magnetic rotor includes a permanent magnet having a plurality of magnetic pole pairs formed on the cylindrical surface of the cylindrical support, facing the cylindrical induction coil portion.

BRIEF DESCRIPTION OF THE DRAWINGS

The detailed structure, features and characteristics of this invention will be described more clearly with the descriptions of the preferred embodiments in conjunction with the accompanying drawings, in which.

DETAILED DESCRIPTION OF PREFERRED EMBODIMENTS

Figure 1B:
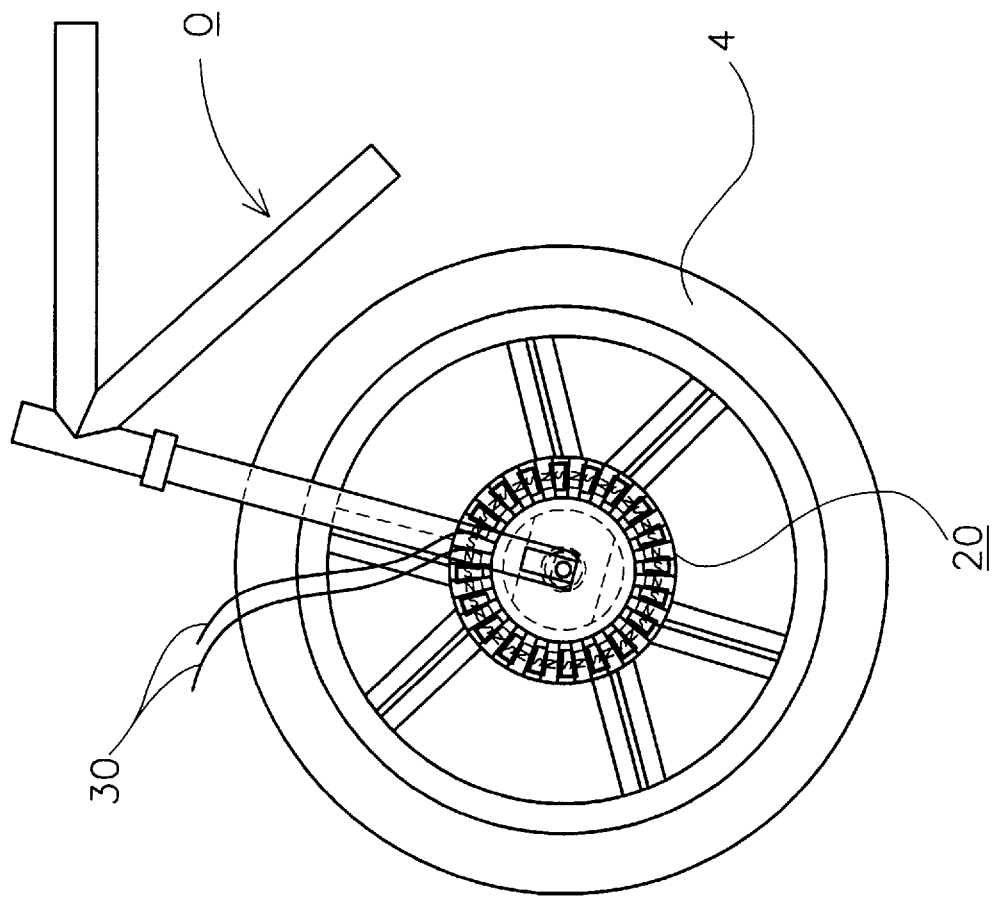
FIG. 1B is the front view of FIG. 1A.
Figure 1A:
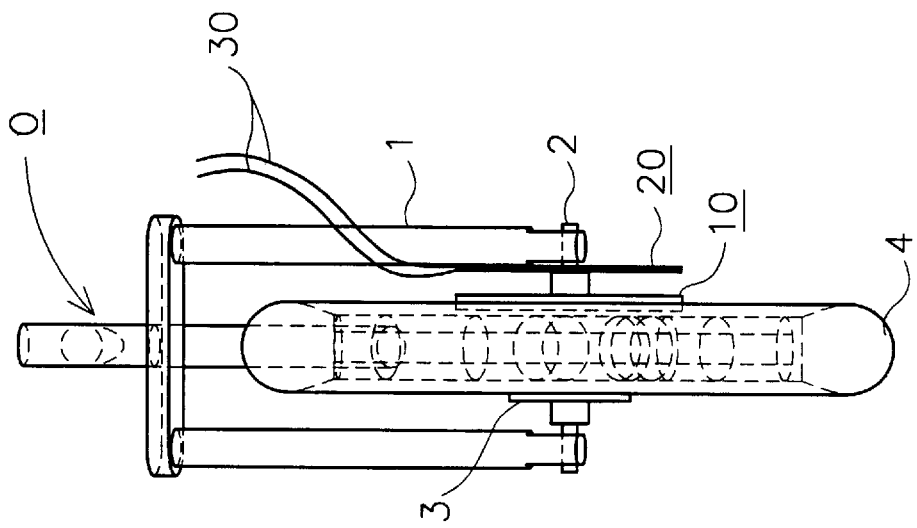
FIG. 1A is an end view showing a bicycle generator according to the first embodiment of this invention and the related part of the bicycle.

FIGS. 1A and 1B are, respectively, the end view and the front view of a bicycle generator, according to the first embodiment of this invention, which is installed in a bicycle. As shown in these two figures, the front wheel of a common bicycle is constituted by a front axle 2 fixed to the lower end of the front fork 1 of the bicycle frame 0, and a revolving portion rotatably supported by the front axle 2. The revolving portion includes a hub 3 and a tire 4, etc. Next, the way how a generator of this invention is installed on the front axle 2 and the revolving portion will be explained.

Figure 9:
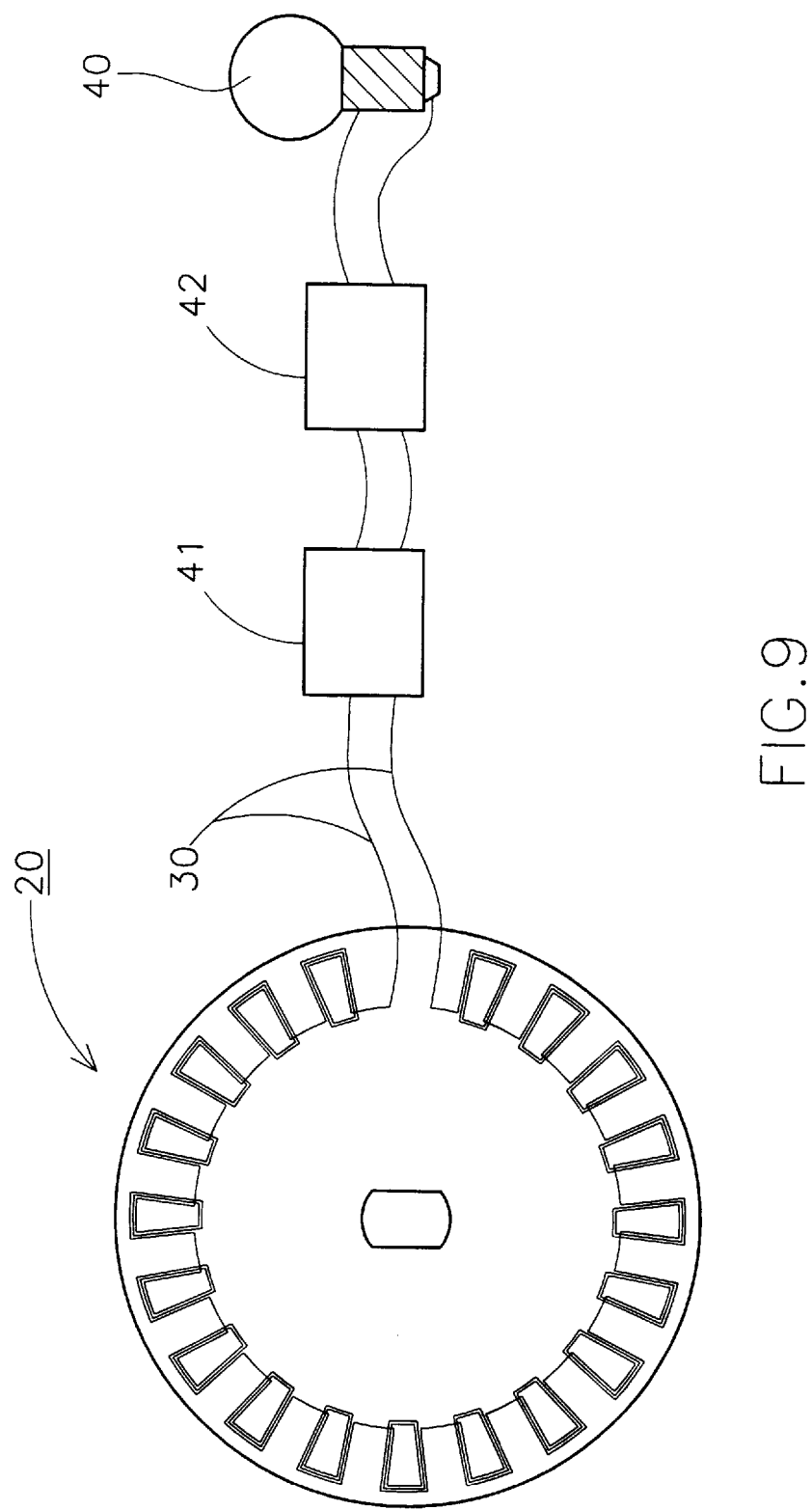
FIG. 9 schematically shows a coil stator together with a rectifier and a capacitor provided intermediate a pair of lead wires connected between the coil stator and an outer load.

Referring to FIGS. 1A and 1B, the first embodiment of the invention includes a magnetic rotor 10 attached to the hub 3, a coil stator 20 fixed to the front axle 2, and a pair of lead wires 30 connected between the coil stator 20 and an outer load such as a bicycle lamp (FIGS. 2A and 9) for supplying electrical energy to the latter.

Figure 2A:
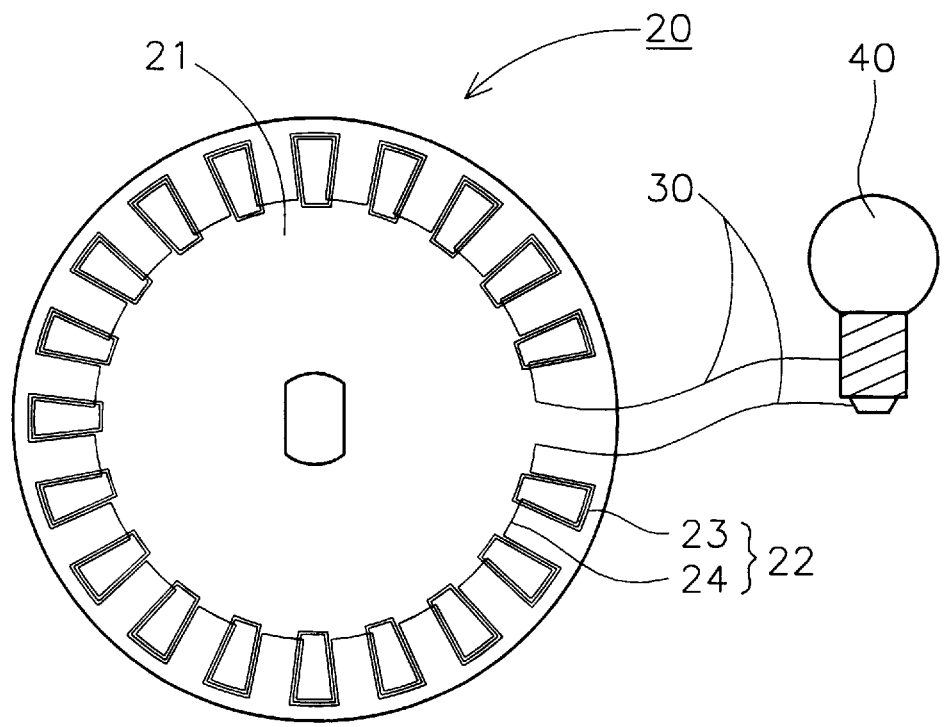
FIG. 2A is a front view of a coil stator included in the bicycle generator shown in FIGS. 1 and 2.
Figure 2B:
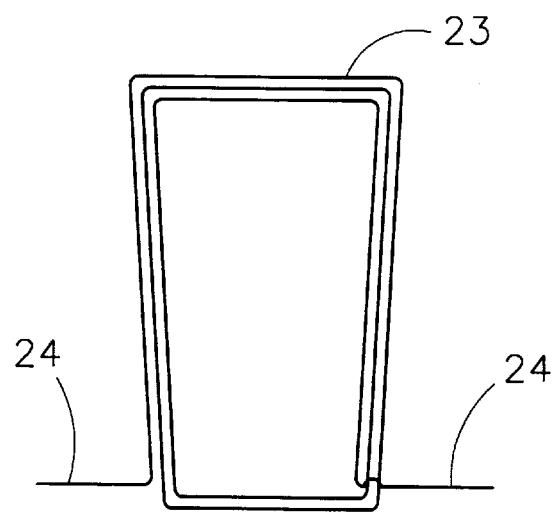
FIG. 2B is an enlarged view showing a coil unit included in the coil stator illustrated in FIG. 2A.

As shown in FIG. 2A, the coil stator 20 includes a disk-shaped planar support 21, an induction coil portion 22 formed by a plurality of series-connected coil units 23 which are evenly spaced along the circumference of the planar support 21, and a pair of lead wires 30 which connect the terminals of the induction coil portion 22 and the external load 40. Adjacent coil units 23 are connected to each other by lines 24 between them. FIG. 2B is an enlarged view showing the structure of a coil unit 23 included in the coil stator illustrated in FIG. 2A. As shown in this figure, a coil unit 23 is composed of several coil loops, each loop being winded into a trapezoid or sector shape. All the coil units 23 constituting the induction coil portion 22 may be formed one by one by automatic winding operation. Thus, the whole coil stator 20 may be produced at high speed by an automatic manufacturing process. The number of coil units 23 of the induction coil portion 22 is the same as the number of magnetic pole pairs 12 of the magnetic rotor 10. Though each coil unit 23 is illustrated to include three loops in FIG. 2B, the loop number of a coil unit certainly need not be limited to three.

Figure 3A:
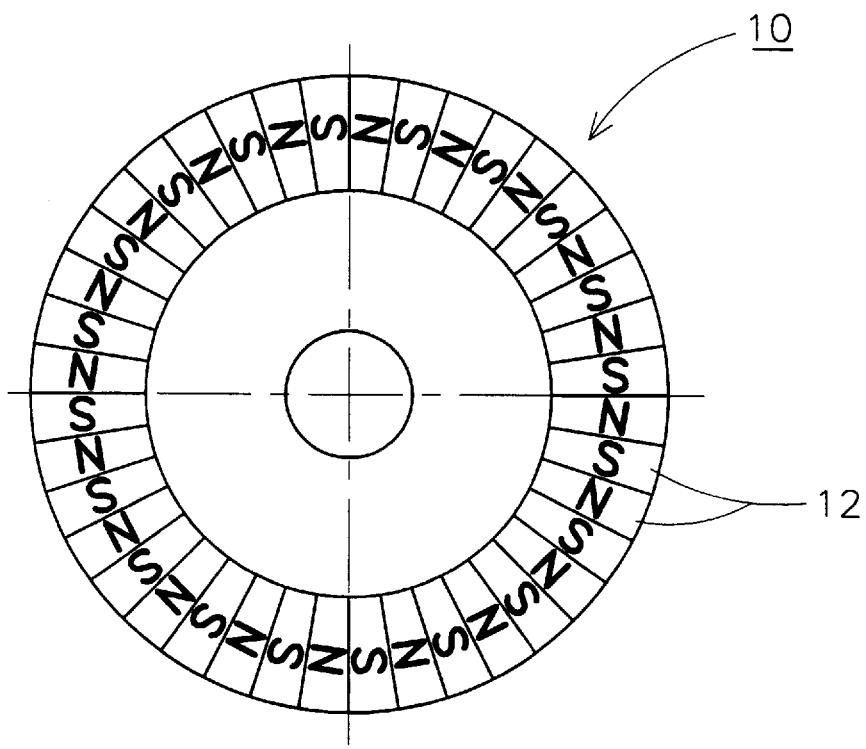
FIG. 3A is a front view of a magnetic rotor included in the bicycle generator shown in FIGS. 1A and 1B.
Figure 3B:
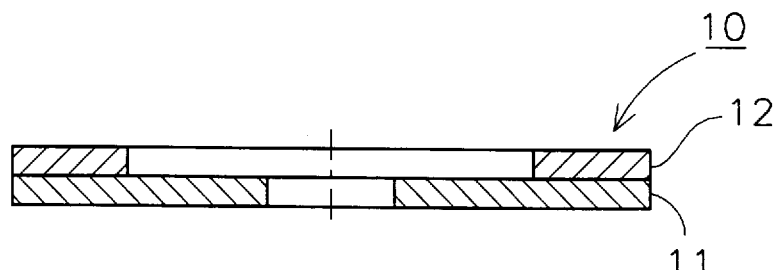
FIG. 3B is an end view of the magnetic rotor shown in FIG. 3A.
Figure 3C:
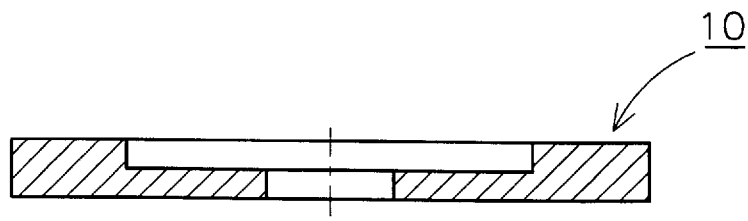
FIG. 3C is another possible end view of the magnetic rotor shown in FIG. 3A.

As shown in FIGS. 3A and 3B, the magnetic rotor 10 includes a disk-shaped planar support 11, and a permanent magnet having a plurality of magnetic pole pairs (NS) 12 which is attached to the circumference of the support 11. Alternatively, the permanent magnet and the support may be integrally formed (FIG. 3C).

Figure 4:
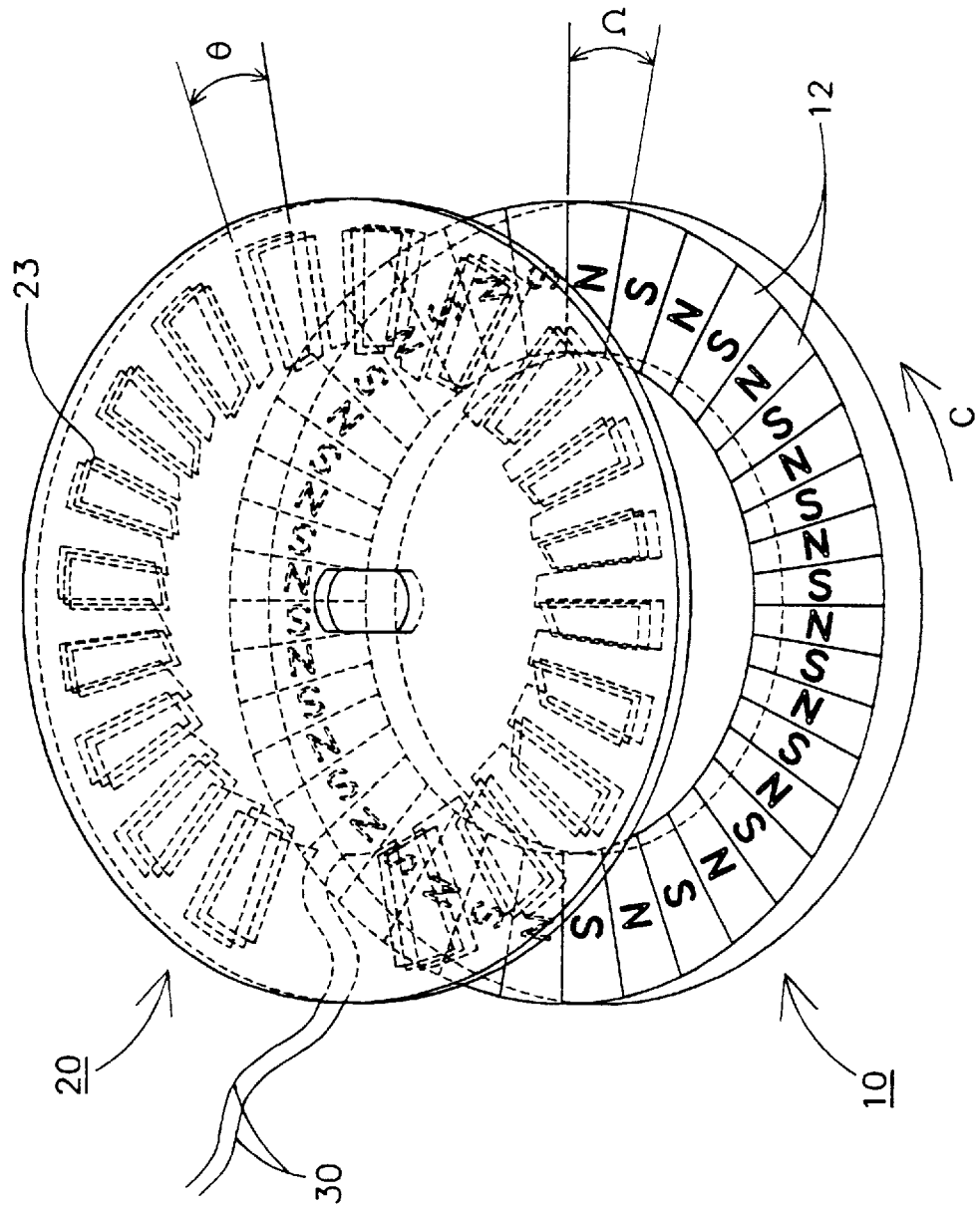
FIG. 4 is a perspective view showing the angular positional relation between the coil stator and the magnetic rotor of the generator shown in FIGS. 1A and 1B.
Figure 5:
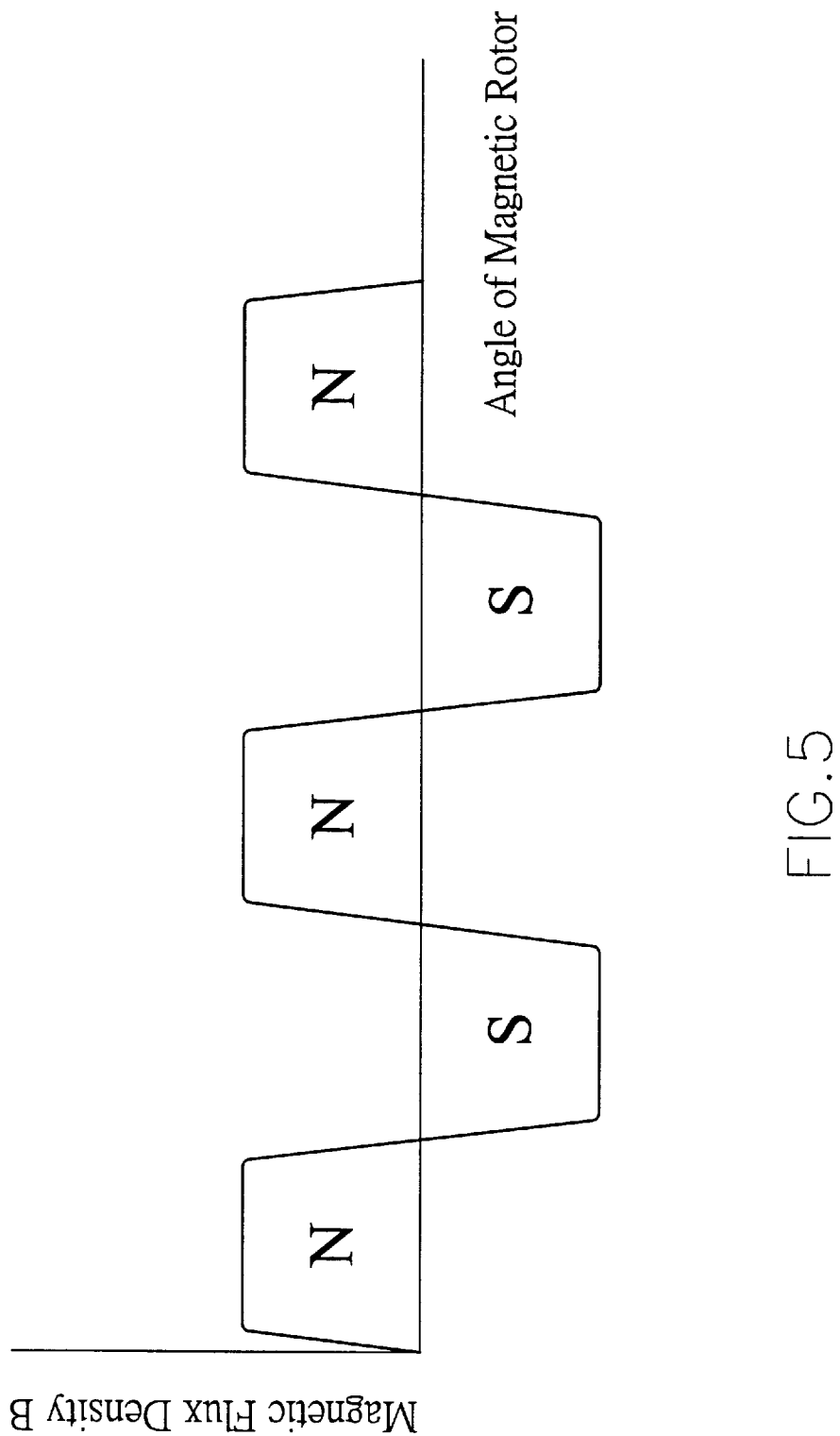
FIG. 5 is a curve showing the angular distribution of the magnetic flux-density generated by the magnetic rotor illustrated in FIGS. 3A, 3B and 3C along the circumference of the magnetic rotor.

When installed on a bicycle, as shown in FIGS. 1 and 4, the magnetic rotor 10 is substantially parallel to the coil stator 20 with a constant gap between them. The rotor 10 may rotate relative to the stator 20 in the direction of arrow C. Since the magnetic rotor 10 has a rather small magnetic pole span angle Ω, namely the width of each magnetic pole N or S is rather small, the angular distribution of the magnetic flux density B along the circumference of the magnetic rotor 10 is similar to the shape of a rectangular pulse wave (FIG. 5).

Figure 6:
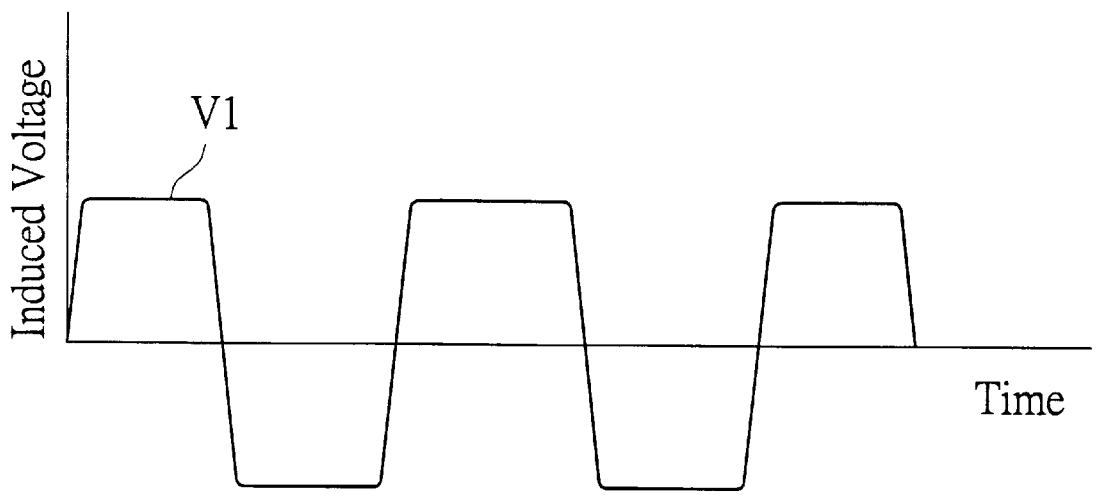
FIG. 6 shows a generally rectangular pulse wave-shaped voltage induced in the coils of the coil stator when the magnetic rotor rotates.
Figure 7:
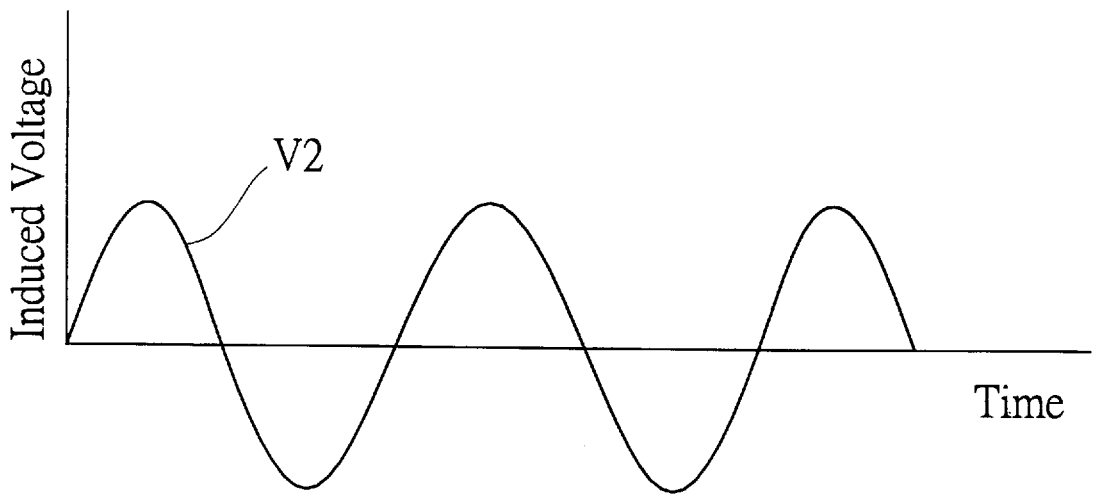
FIG. 7 shows a sine wave-shaped voltage generated by a conventional generator.

The span angle θ of each coil unit 23 is substantially equal to the span angle Ω of each magnetic pole included in the magnetic rotor 10(FIG. 4). Therefore, when the magnetic rotor 10 revolves together with the hub 3 relative to the coil stator 20, a nearly rectangular pulse wave-shaped voltage V1 (FIG. 6) is induced in the induction coil portions 22 of the coil stator 20 due to the fact that the coil units 23 keep on cutting the magnetic field produced by the magnetic rotor 10. In contrast, the induced voltage V2 produced by a conventional bicycle generator is shown in FIG. 7.

Figure 8:
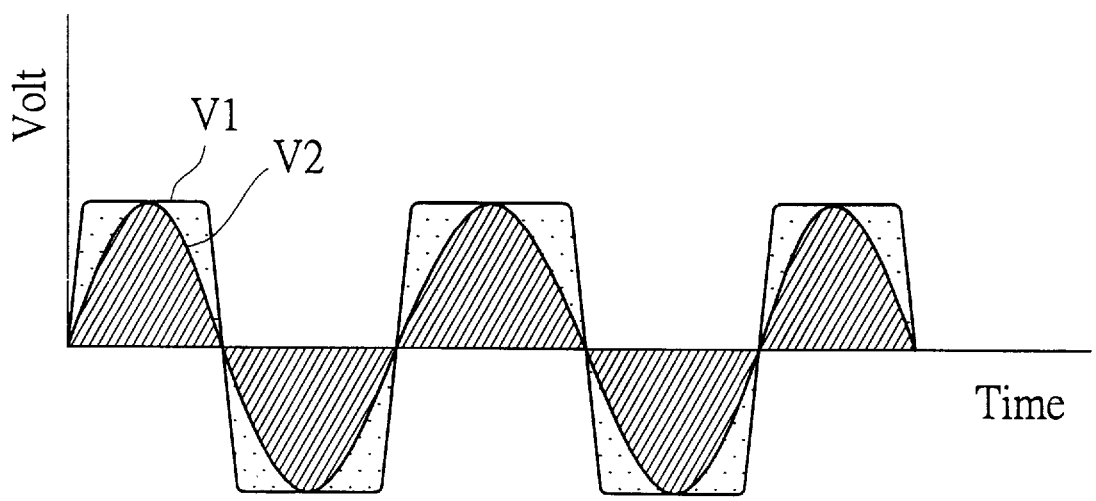
FIG. 8 shows the wave shape of the voltage generated by a bicycle generator of this invention in comparison with that generated by a conventional generator.

Referring to FIG. 8, the induced voltage V1, having a nearly rectangular shape, produced by the bicycle generator of this invention is compared with the induced voltage V2, having a sine wave shape (FIG. 7), produced by a conventional bicycle generator. It can be readily found that the former voltage V1 has a valid voltage wave area larger than that of the latter voltage V2. In other words, the bicycle generator of this invention has a better efficiency in electricity generation. Besides, in the aforesaid bicycle generator of this invention, since both the rotor and the stator are of planar shapes and are parallel to each other, the gap between them keeps constant. Consequently, no "slot effect" problem or reluctance torque problem occurs in a bicycle generator of this invention. Thus, the rider's load can be reduced and the efficiency of generator can be greatly improved in comparison with a conventional bicycle generator as described above.

Preferably, a rectifier 41 and a capacitor 42 are further provided intermediate the pair of lead wires 30 connecting the induction coil portions 22 and the external load 40 (see FIG. 9) so as to stabilize the current supplied by the bicycle generator and to avoid interruption of current supply when the bicycle stops.

Next, the bicycle generator according to the second embodiment of this invention is described with reference to FIG. 10. This bicycle generator comprises a cylindrical coil stator 60, a cylindrical magnetic rotor 50, and a pair of lead wires 30 which connect the terminals of the cylindrical induction coil portion 62 and an external load (not shown). Similar to the above first embodiment, the cylindrical coil stator 60 is fixed to the front axle of the bicycle, and cylindrical magnetic rotor 50 is attached to the hub. of the bicycle.

Figure 10:
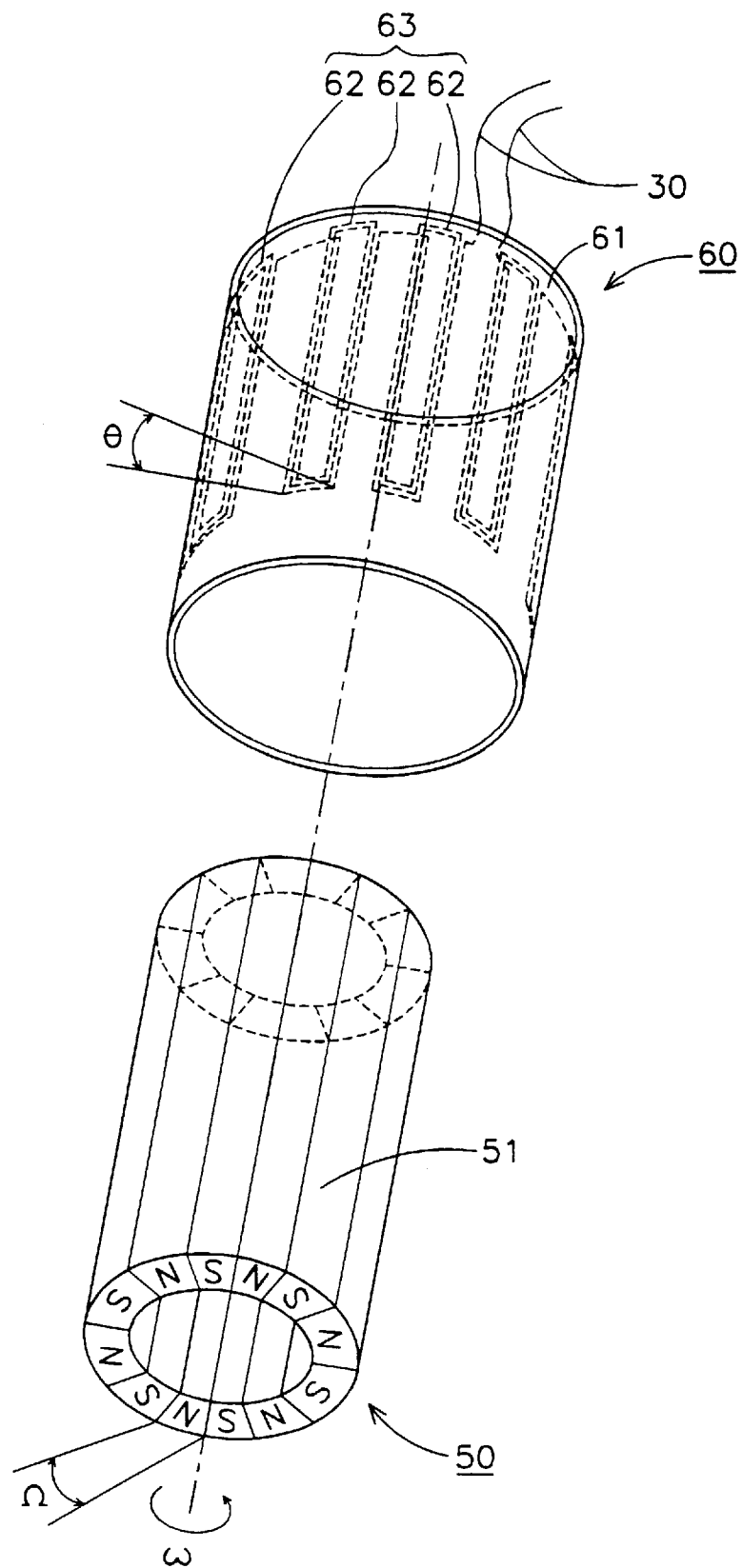
FIG. 10 is an exploded perspective view showing a bicycle generator according to the second embodiment of this invention.

The cylindrical coil stator 60 includes a cylindrical support 61 having a first cylindrical surface, and a cylindrical induction coil portion 63 formed by a plurality of series-connected coil units 62 (only five coil units 62 are shown in FIG. 10) which are evenly spaced on the first cylindrical surface of the cylindrical support 61 in the circumferential direction. Each coil unit 62 is composed of several substantially rectangular coil loops.

The cylindrical magnetic rotor 50 is substantially coaxial with and radially spaced from the cylindrical coil stator 60 with a constant radial gap therebetween, and is rotatable relative to the cylindrical coil stator 60. The cylindrical magnetic rotor 50 includes a second cylindrical surface and a permanent magnet having a plurality of magnetic pole pairs 51 formed on the second cylindrical surface facing the cylindrical induction coil portion 63.

Similar to the case of the first embodiment, the number of the coil units 62 of the cylindrical induction coil portion 63 is the same as the number of magnetic poles pairs 51 of the magnetic rotor 50, and each magnetic pole 51 in the cylindrical magnetic rotor 50 has a magnetic pole span angle Ω substantially identical to the span angle θ of each coil unit 62 in the induction coil portion 63. Though each coil unit 62 is illustrated to include three loops in FIG. 10, the loop number of a coil unit 62 certainly need not be limited to three.

Preferably, a rectifier and a capacitor are further provided intermediate the pair of lead wires 30 connecting the induction coil portions 63 and an external load so as to stabilize the current supplied by the bicycle generator and to avoid interruption of current supply when the bicycle stops.

The aforesaid preferred embodiments of the invention are used only for illustrating and not for limiting this invention. Variations and modifications may be made without departing from the scope of the invention. Therefore, the scope of this invention is intended to cover the following appended claims.

What is claimed is:

1. A bicycle generator comprising:

a planar coil stator including a planar support and an induction coil portion, said induction coil portion being formed by a plurality of series-connected coil units which are evenly spaced along the circumference of said planar support; and a planar magnetic rotor which is rotatable relative to and substantially parallel to said coil stator, said rotor including a permanent magnet having a plurality of magnetic pole pairs formed on the circumference thereof;

wherein a number of said coil units in said induction coil portion is equal to the number of said magnetic pole pairs in said rotor.

2. A bicycle generator according to claim 1, wherein each of said coil units is wound into a trapezoid/sector shape and the span angle of each of said magnetic poles in said rotor is substantially equal to the span angle of each of said coil units in said coil stator.

3. A bicycle generator, comprising:

a cylindrical coil stator including a cylindrical support having a first cylindrical surface and a cylindrical induction coil portion, said cylindrical induction coil portion being formed by a plurality of series-connected coil units which are evenly spaced on said first cylindrical surface of said cylindrical support in the circumferential direction; and a cylindrical magnetic rotor which is substantially coaxial with and radial spaced from said cylindrical coil stator with a constant radial gap therebetween, which is rotatable relative to said cylindrical coil stator and which includes a second cylindrical surface and a permanent magnet, said permanent magnet having a plurality of magnetic pole pairs formed on said second cylindrical surface facing said cylindrical induction coil portion;

wherein a number of said coil units of said cylindrical induction coil portion is equal to the number of said magnetic pole pairs of said cylindrical magnetic rotor.

4. A bicycle generator according to claim 3, wherein each of said coil units is wound into a rectangular shape and the span angle of each of said magnetic poles of said cylindrical magnetic rotor is substantially equal to the span angle of each of said coil units in said cylindrical coil stator.

* * * * *